United States Patent [19]
Goode

[11] 3,931,757
[45] Jan. 13, 1976

[54] ELECTRICALLY HEATED DRY CEREAL GRAIN EXPANDER

[75] Inventor: Raymond A. Goode, Elgin, Ill.

[73] Assignee: Dunbar Manufacturing Co., Inc., South Elgin, Ill.

[22] Filed: Sept. 25, 1972

[21] Appl. No.: 292,264

[52] U.S. Cl. ............ 99/323.11; 99/323.5; 219/349; 219/405
[51] Int. Cl.² .......................................... A23L 1/18
[58] Field of Search........... 99/323.9, 323.11, 323.8, 99/323.7, 323.6, 323.5, 323.4, 389, 385, 401; 219/405, 349

[56] References Cited
UNITED STATES PATENTS

| 1,587,023 | 6/1926 | Mottlau ....................... 219/349 UX |
| 2,606,489 | 8/1952 | Morsette ........................ 99/323.11 |
| 2,812,704 | 11/1957 | Hawks .............................. 99/323.8 |
| 3,152,242 | 10/1964 | Mott .................................... 99/401 |
| 3,180,247 | 4/1965 | Hill ................................... 99/323.9 |
| 3,334,620 | 8/1967 | Werth .................................. 99/401 |

FOREIGN PATENTS OR APPLICATIONS
140,582   4/1949   Australia ............................ 219/405

*Primary Examiner*—Harvey C. Hornsby
*Assistant Examiner*—James A. Niegowski
*Attorney, Agent, or Firm*—Kinzer, Plyer, Dorn & McEachran

[57] ABSTRACT

A dry-process corn popper or like heat-expansion device for cereal grains, of the kind comprising a horizontally oriented metal mesh expansion cylinder which is charged with grain; the cylinder is rotated in one direction while being heated to expand the grain, the grain being discharged upon expansion, and the cylinder is subsequently rotated in the opposite direction to discharge incompletely expanded grain and other waste from the bottom of the cylinder. An electrically-powered heat source, producing radiant heat energy, is positioned near the side of the cylinder, away from the waste discharge location; a reflector directs the radiant heat onto and into the rotating cylinder to heat the grain and expand it.

5 Claims, 7 Drawing Figures

ELECTRICALLY HEATED DRY CEREAL GRAIN EXPANDER

BACKGROUND OF THE INVENTION

The interior of a popcorn kernel consists primarily of a hard, corneous starch. When this hard material is heated, the starch becomes plastic; however, due to the almost spherical shape of the kernel and its strong hull, the grain of popcorn retains its shape when heated until internal pressure caused by vaporization of moisture in the grain exceeds the strength of the hull. At this stage, the hull explodes or "pops" and the plasticized starch expands. This expansion has a refrigerating effect which cools the plastic material almost instantaneously and "freezes" it in the well-known blossom shape of popped corn.

For effective expansion of popcorn or other cereal grains, the rate of heating of the grain is critical. For popcorn, the heating rate should be sufficient to bring the grain to popping temperature in a period of 1.5 to 2.5 minutes. If the grain is heated too rapidly, the temperature at the center of the grain remains too low for popping and only the outer portion of the grain is expanded, producing a small popped grain with a gritty and incompletely popped center. Conversely, if the grain is heated too slowly, the moisture within the grain may be driven out before the grain is hot enough to expand, resulting in small, tough, popped grain.

Two heating techniques are commonly used for popping the corn. In one method, the grain is exposed to a bath of hot popping oil which surrounds the grain and provides a rapid heat transfer to the grain. This "wet" popping method, although thermally efficient and relatively simple, coats the popped grain with the oil, changing its flavor. An extremely stable and indigestible oil must be used to withstand the high temperatures (400°–500°F.) necessary to this process. Only about half of the expensive oil is delivered with the corn; the rest is lost by vaporization or sticks to the pan and to unpopped waste corn. Where the popped corn is to be coated with a flavoring, such as butter or caramel, the oil may interfere with the coating process.

In the second method, known as "dry" popping, each grain is heated in the optimum period of time while the grain is tumbled in a rotary cylinder to insure even heating. When the kernel pops, it is promptly conveyed away from the source of heat. All imperfectly popped corn is subsequently delivered to a waste bin. This dry popping method eliminates both the cost and the taste of the oil used in "wet" popping and produces consistently larger kernels.

Previously known dry poppers have usually utilized a gas flame as the heat source. The necessity for rapid heating of the popcorn or other grain has dictated the positioning of the heat source directly below the expansion chamber or cylinder containing the corn, for reasons of efficiency and economic practicality, the corn being heated primarily by convection. For the same reasons, the dry popping process has required the direct application of heat to the corn or other grain; to this end an expansion chamber of perforated metal or of small mesh wire screen, in which the corn can be agitated during the popping process, has been utilized.

A primary problem encountered in conventional dry popping apparatus is the fire hazard that is created while the corn is being simultaneously agitated and heated, and the related possibility that popped kernels of corn may ignite during the short time interval in which they are exposed to the flame beneath the popping chamber. Bits of chaff accompanying the corn and tiny tips of the corn which break off during agitation fall through the perforations in the expansion chamber, burning as they pass through the flame or onto the heater. These burning particles also produce an additional minor possibility of fire in the waste receptacle, which is located below the heater and which also contains partially popped kernels of corn dumped into the receptacle following previous popping operations.

Conventional electrical resistance heaters could be substituted for the gas heaters customarily used in dry popping equipment. If this is done, however, the plastic nature of the falling waste, when exposed to high heat, causes a build-up of material on the resistance heating elements. As a consequence, the electrical heaters rapidly lose efficiency or burn out prematurely. If heat lamps are employed, instead of resistance heaters, the burning waste coats the lamps, with resultant loss in efficiency, or may even cause them to break. Thus, electrical heating elements, when substituted for conventional gas heaters, are neither efficient or economically practical. Furthermore, conventional heat lamps of the required high heat capacity are excessively expensive and the replacement costs are prohibitive if used in this manner. At present, gas-fired dry popping apparatus cannot be used in many locations because of fire protection codes. For example, fire codes have precluded the use of dry poppers in theaters for many years. The same prohibition apply in many large shopping centers. Thus, wet popping has continued in use in many applications despite the improved product and increased efficiency that can be achieved with the dry popping process.

SUMMARY OF THE INVENTION

It is a principal object of the present invention, therefore, to provide a new and improved electrically heated corn popper or like grain expander, for dry expansion of cereal grain, that effectively and inherently eliminates or minimizes the problems of previously known apparatus as discussed above.

A particular object of the invention is to provide a new and improved dry corn popper or like grain expander that utilizes an electrical heat source in a manner which effectively precludes coating of the heating element with burning or partially burnt waste products that escape from the expansion chamber during the popping process, yet which affords an efficient and effective heating operation.

A particular object of the invention is to provide a new and improved electrically heated corn popper or like grain expander for dry expansion of cereal grain that presents little or no fire hazard and that can be acceptable for use in crowded public locations such as theater lobbies and the like.

A principal feature of the invention is the provision of an electrically powered radiant heat source in a dry process corn popper or like grain expander, that can operate efficiently even though spaced a substantial distance from the grain expansion chamber, substantially completely out of the path of any waste which escapes from the expansion chamber.

A specific object of the invention is to provide a new and improved electrically heated corn popper or like grain expander for dry expansion of cereal grain that is simple and economical in construction and that requires a minimum of maintenance over a long operational life.

Accordingly, the invention relates to an electrically heated corn popper or like grain expander for dry expansion of cereal grain. The grain expander comprises a multi-perforate expansion chamber for receiving and retaining a supply of cereal grain for expansion, the expansion chamber having a main outlet for expanded grain and an auxiliary outlet for unexpanded grain and other waste. Agitation means are provided for agitating the contents of the expansion chamber, together with discharge means for initiating a discharge of unexpanded grain and other waste at a given location relative to the expansion chamber. An electrically powered source of radiant heat energy is positioned adjacent to but spaced from the expansion chamber at a heater position displaced from the waste discharge location. Reflector means, located at the heater position, direct radiant heat energy from the heat source into the expansion chamber to heat the chamber and its contents and to expand the supply of cereal grain contained therein.

DESCRIPTION OF THE PREFERRED EMBODIMENT

Figure 2:
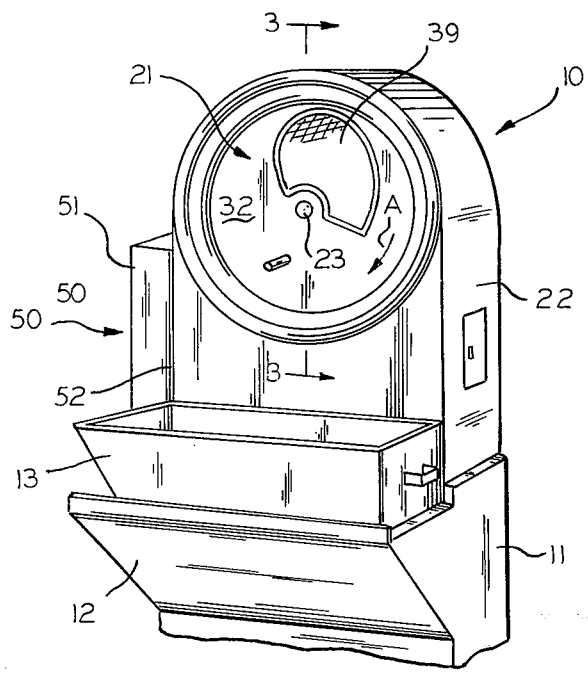
FIG. 2 is a front perspective view of the corn popper.
Figure 1:
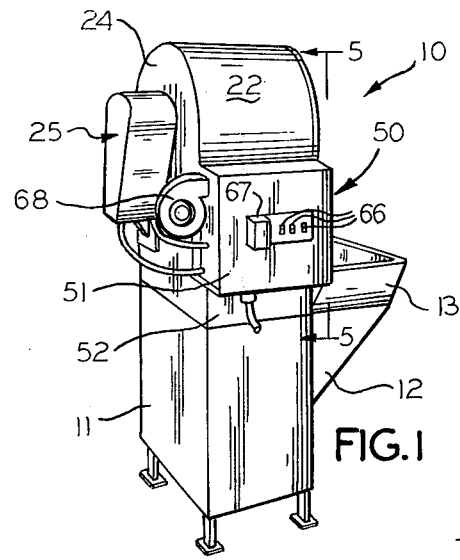
FIG. 1 is a side perspective view of an electrically heated dry corn popper constructed in accordance with one embodiment of the present invention.

FIGS. 1 and 2 afford a general illustration of an electrically heated corn popper 10 or like grain expander for dry expansion of cereal grain constructed in accordance with the present invention. Corn popper 10, as shown in FIGS. 1 and 2, is mounted upon a stand or base 11 that includes a forward projection 12 supporting a container 13 for receiving and temporarily storing the popped corn.

The electrically heated corn popper 10 includes a rotatable grain expansion chamber 21 (FIG. 2) mounted in the upper portion of a housing 22. The grain expansion chamber 21 is a cylinder that is mounted upon a cantilever shaft 23. At the rear side 24 of popper 10 (FIG. 1), the cylinder shaft is connected to a belt drive 25 that is in turn connected to a reversible electric motor for rotating the cylinder. The drive for cylinder 21 is not critical to the present invention and hence has not been illustrated in detail in the drawings.

Figure 3:
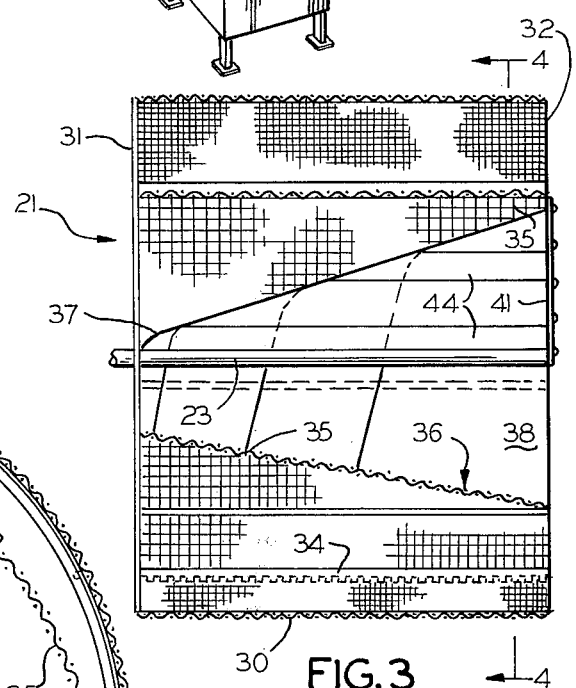
FIG. 3 is a sectional view of the expansion cylinder for the corn popper of FIGS. 1 and 2, taken approximately along line 3—3 in FIG. 2.
Figure 4:
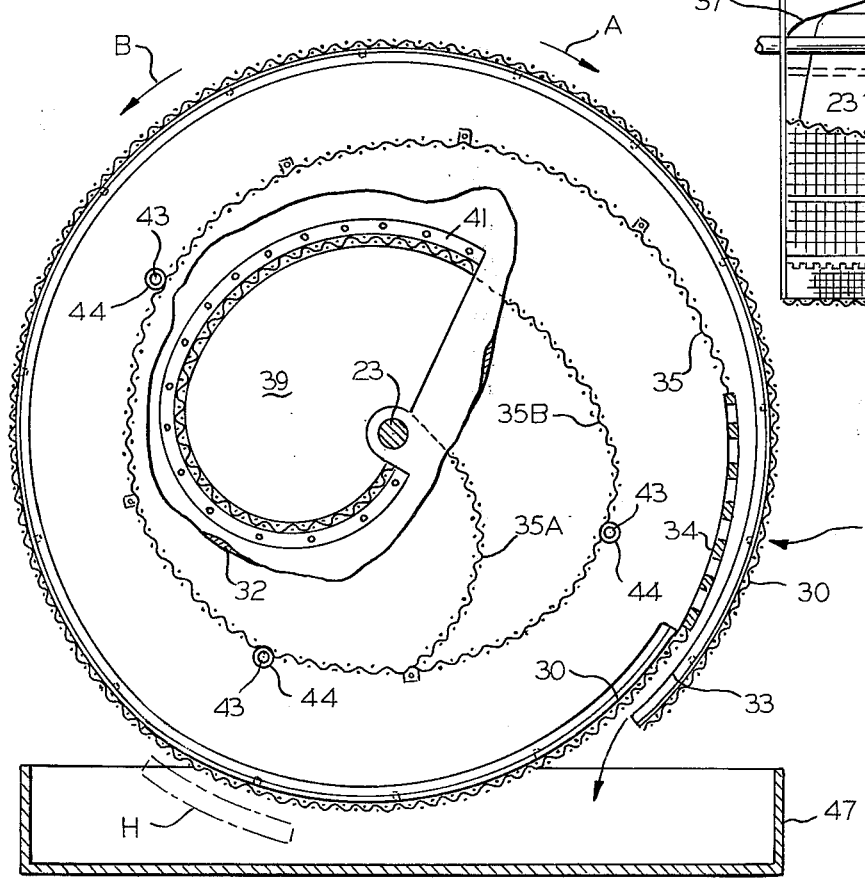
FIG. 4 is a sectional view of the expansion cylinder taken approximately along line 4—4 in FIG. 3.

The rotary grain expansion cylinder 21 is of convoluted construction, formed of metal mesh or other multi-perforate metal, as shown in some detail in FIGS. 3 and 4. The peripheral portion 30 of cylinder 21 is constructed of a relatively small wire mesh or of perforated metal, and extends between two end plates 31 and 32 that are affixed to the cylinder shaft 23. The openings in the peripheral member 30 must be small enough so that unexpanded grain cannot pass through; No. 8 wire mesh is suitable. As best shown in FIG. 4, the outer wire mesh portion 30 of cylinder 21 extends for slightly more than 360°, with overlapping ends separated by a waste discharge aperture 33. The inner end of the wire mesh 30 is connected to one end of a slotted separator plate 34 which extends for the full axial length of the popping cylinder 21 but spans only a small arcuate portion of the interior peripheral area in cylinder 21. A larger wire mesh member 35 is joined to the inner end of separator plate 34. This inner mesh member 35 is wound in a continuous spiral comprising turns 35A and 35B, forming a cone 36, the conical configuration being best illustrated in FIG. 3. The openings in member 35 should be large enough to pass unexpanded grain, but small enough so that popped grain will not pass through the mesh openings or perforations; No. 2 mesh is suitable.

The internal cone 36 formed by member 35 in expansion cylinder 21 has a small end 37 adjacent the rear plate 31 of the cylinder. This cone gradually expands forwardly of the cylinder, terminating in a wide front end 38. A part of the wide end 38 for the mesh cone is covered by the front plate 32 of expansion cylinder 21, leaving an opening 39 in the front of popper 10 (FIGS. 1 and 4), through which raw corn is introduced and popped corn is discharged. A trim ring 41 encloses the popped corn discharge opening 39 and serves as a support for the wide end of mesh 35. The cover plates 31 and 32 of cylinder 21 are joined by a series of tie rods 43 and the spacing between the cover plates is maintained by a plurality of tubular spacers 44 (FIGS. 3 and 4), the spacers 44 being mounted on the tie rods 43. The cover plates 31 and 32 are appropriately keyed to shaft 23 so that cylinder 21 is rotated when shaft 23 is driven.

The corn popper or like grain expander 10, as thus far described, is substantially conventional in construction and operation, being essentially similar to the manually controlled rotary corn poppers marketed by Dunbar Manufacturing Co. Inc. as Model Nos. 12, 15, 17 and 3600. A similar popper, with automated control and corn feed, is disclosed and claimed in Goode U.S. Pat. No. 3,450,539, to which the present invention may also be applied.

At the outset, in a corn popping operation, the drive 25 for expansion cylinder 21 is energized, rotating the expansion cylinder in the direction indicated by arrows A in FIGS. 2 and 4. The heat source for the corn popper, which has not yet been described, is then energized and the popper is allowed to run for a short period of time to stabilize thermal conditions in the popper. With the expansion cylinder 21 heated and rotating, the operator charges the popper cylinder with a supply of corn, throwing the popcorn into the front or main opening 39 of the cylinder when the main opening is just above center in the position generally indicated in FIG. 2. In charging popper 10, the operator throws the corn toward the right-hand side of cylinder 21.

With a properly adjusted popper, the corn in cylinder 21, to which heat is still applied, begins popping in a period of about two minutes or slightly less. In subsequent batches, the initial popping will occur after a somewhat shorter interval, usually about 1.5 to 1.8 minutes. When the supply of cereal grain, such as corn, is first thrown into the front opening 39, it quickly passes through the relatively large openings in the internal mesh member 35, coming to rest in the periphery of cylinder 21, where it is held by the outer mesh member 30. Throughout the popping period, the unpopped corn remains in the peripheral portion of expansion cylinder 21, supported by mesh 30, where it is rapidly heated by the external heat source. The rotational movement of cylinder 21, which rotates continuously during popping, agitates the grain and thus prevents localized overheating and consequent burning. Each time the unpopped grain tries to move from the external mesh 30 into the conical section of the cylinder formed by mesh 35, it passes through mesh 35 and returns to mesh 30.

As the kernels of corn pop, however, they expand greatly in size so that they are larger than the openings in member 35 and can no longer pass through the mesh. As a consequence, the popped corn is carried into the conical portion 36 of the expansion chamber, formed by member 35, by the rotational movement of cylinder 21. As the popped corn is rotated within the conical part 36 of cylinder 21, it is brought into the part of the cone aligned with opening 39 and is discharged from the front of cylinder 21 into the receptacle 13 (FIG. 2).

The time interval required for popping a supply of corn in expansion cylinder 21 is about two minutes. The completion of a popping operation is indicated when the sound of the popping corn diminishes to an occasional "pop". When the popped corn is completely discharged from the cylinder, as described above, the operator can stop the rotation of cylinder 21 and can then actuate its reversible drive 25 (FIG. 1) to rotate cylinder 21 in the reverse direction indicated in FIG. 4 by arrow B. With cylinder 21 rotating in the reverse direction, any remaining unpopped kernels and partially popped kernels, are discharged from cylinder 21, through opening 33, into a waste receptacle 47 positioned below drum 21 as generally indicated in FIG. 4. Actually, the waste receptacle 47 would be positioned at a lower elevation relative to the cylinder. Ordinarily, one or two revolutions in the reverse direction will clear cylinder 21 of any waste, at which point the popping operation is complete and cylinder 21 can be stopped. If further popping is desired, the foregoing sequence of operations is repeated.

Figure 5:
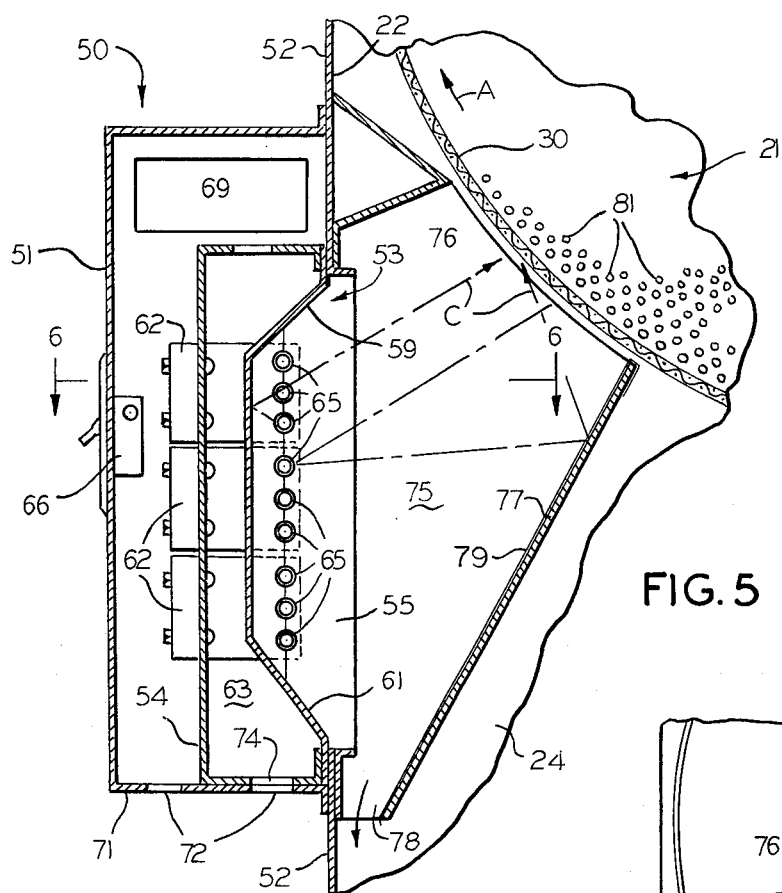
FIG. 5 is a sectional elevation view, drawn to an enlarged scale, of the electrical heater for the corn popper, taken approximately along the line 5—5 in FIG. 1.
Figure 6:
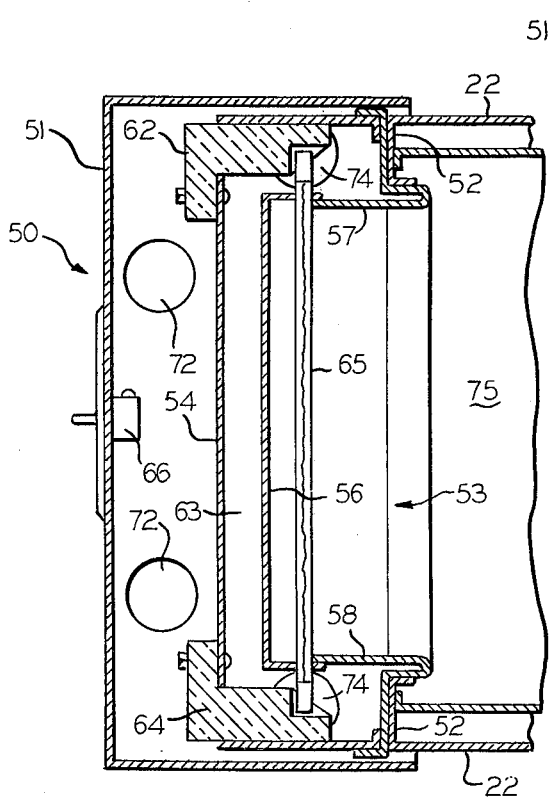
FIG. 6 is a detail sectional plan view of the electrical heater taken approximately along line 6—6 in FIG. 5.

In a conventional gas-heated dry popper, the heat source is a gas-fired heater located below drum 21 in close proximity to the drum, as generally indicated by the dash outline H in FIG. 4. Popper 10, however, incorporates a completely different electrical heat source 50 that is mounted at the side of the popper shown in FIGS. 1 and 2. Heat source 50 includes an external housing 51 mounted on popper housing 22 in encompassing relation to a large opening 53 in the side wall 52 of the popper housing, as best shown in FIGS. 5 and 6. Heat source 50 further comprises an internal housing 54, positioned within the main heater housing 51, that is also disposed in encompassing relation to the wall opening 53 in popper housing 22.

A reflector 55 is mounted in the open end of the internal housing 54, closing off the opening 53 in the popper housing wall. Reflector 55 has a back wall 56, two side walls 57 and 58, a top wall 59, and a bottom wall 61, the top and bottom walls converging toward back wall 56 as shown in FIG. 5.

Figure 7:
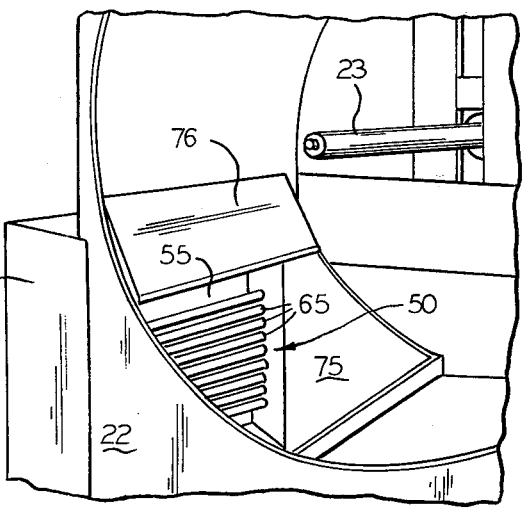
FIG. 7 is a detail perspective view of the interior of the corn popper housing, with the expansion cylinder removed, showing the relationship of the heat source to the expansion cylinder.

Three porcelain lamp holders 62 are mounted on one side of the internal heat source housing 54, projecting into the space 63 enclosed by the internal housing 54 and reflector 55, as shown in FIGS. 5 and 6. At the opposite side of heat source 50, three similar lamp holders 64 are mounted on housing 54 and project into space 63 (FIG. 6). Each of the lamp holders 62 and 64 has a capacity of three lamps and each projects beyond one of the side walls 57 and 58 of reflector 55. Nine infra-red quartz heat lamps 65 are mounted in the lamp holders 62 and 64, each lamp 65 projecting through the two side walls 57 and 58 of reflector 55, so that all of the lamps extend across the interior of reflector 55 (FIGS. 6 and 7).

The lamps 65 are electrically connected, through their lamp holders 62 and 64, to three lamp control switches 66 mounted on the outside housing 51 of heat source 50; three lamps are connected to each switch. It is not essential that three separate switches be used; a single switch can be provided for all of the heat lamps 65, but this usually requires an excessively expensive high-current switch. As shown in FIG. 1, the switches 66 are readily accessible to the operator of corn popper 10. Preferably, they are mounted immediately adjacent a suitable reversing switch 67 that controls the drive 25 for the popper cylinder 21, so that the basic controls for the popper are all accessible at a common location.

A small centrifugal air blower 68 is mounted on the upper portion of the outer housing 51 of heat source 50 (FIG. 1). The outlet of blower 68 is connected to an opening 69 in the top of the outer housing 51. The bottom wall 71 of housing 51 is provided with a plurality of openings 72 for the escape of air blown into housing 51 through opening 69. Air access and egress openings 73 and 74 are also provided in the top and bottom walls, respectively, of the internal housing 54, to provide for air circulation through the space 63 between housing 54 and reflector 55.

As most clearly shown in FIG. 5, reflector 55 and lamps 65 are positioned somewhat below and to one side of expansion cylinder 21, in a position displaced from the location at which waste is discharged from cylinder 21. This relationship is also illustrated in FIG. 7, in which it is apparent that the heat lamps 65 extend for the full length of the housing in which cylinder 21 is mounted. An internal reflector 75 is mounted within the upper housing 22, in alignment with reflector 55, and serves as a continuation of reflector 55, extending to a point closely adjacent the periphery of expansion cylinder 21. The upper portion 76 of reflector 75 is of V-shaped configuration, this construction being employed to afford adequate strength for the reflector. The lower wall 77 of reflector 75 forms a chute having a bottom opening 78 for the discharge of chaff and other fine particles that may pass through the mesh 35 at the outer wall of cylinder 21 as the cylinder rotates past heat source 50.

In operation, with cylinder 21 rotating as described above, switches 66 are actuated to energize the infra-red heat lamps 65. Lamps 65 produce substantial quantities of heat, primarily in the infra-red range. Virtually all of this heat is reflected, by reflectors 55 and 75, to impinge upon the raw grain 81 in the limited portion of cylinder 21 instantaneously aligned with the open end of reflector 75. The action of the reflectors, in effectively focusing the radiant heat on cylinder 21, is generally indicated in FIG. 5 by the arrows C.

The radiant heat from lamps 65 rapidly heats the popcorn kernels or other grain 81. Adequate heat is provided for expanding the grain within the limited time period necessary to achieve effective full popping. Any chaff or other small-particle waste that passes through the cylinder mesh 30 cascades down the chute defined by the lower wall 77 of reflector 75. This waste does not come into contact with lamps 65, with reflector 55, or with reflector element 76. Consequently, reflector 55 and the upper portion 76 of reflector 75 remain quite clean and require little or no maintenance. Occasional cleaning, on an extended time basis (i.e., every six months), is adequate to maintain these parts of the reflector structure bright and efficient in operation.

The inner reflective surface of the lower wall 77 of reflector 75 may tend to collect some materials discharged from popping cylinder 21, so that more frequent maintenance is necessary. Alternatively, the inner surface of reflector wall 75 may be covered with aluminum foil 79, oriented with the bright side of the foil facing inwardly of the reflector structure. It is then a simple matter, when cleaning is required, to replace the used foil with a new, clean sheet of foil, promptly restoring the full efficiency of the reflector for further operations.

The electrical circuits for the heat lamps 65 are interlocked with the energizing circuit for blower 68 (FIG. 1) so that blower 68 is operated continuously whenever the heat lamps are energized. Thus, whenever the heat lamps are on, air is blown into housing 51 from opening 69 and passes through the housing and out openings 72. This effectively cools the electrical components comprising the switches 66 and the outer portions of the lamp holders 62 and 64. The air from blower 68 also enters the space 63, within the internal housing 54, through the top openings 73 (FIG. 5) and passes out of space 63 through the bottom openings 74 (FIGS. 5 and 6). In this manner, reflector 55 is continuously cooled and the inner portions of lamp holders 62 and 64 are also cooled.

As described and illustrated, heater 50 includes nine infra-red quartz lamps, and the heating of the raw corn 81 (FIG. 5) is accomplished by radiant heat energy primarily in the infra-red range. Other forms of electrically energized radiant heat sources may be employed, particularly heat lamps having the capacity for heating the corn rapidly enough to achieve popping within a limited time interval as specified above. On the other hand, it may be desirable to employ other forms of radiant heat that can be effectively directed to impinge upon the corn in a limited band of the expansion cylinder 21. Thus, a microwave source with appropriate wave guide structure could be employed, although this is likely to be more expensive than the infra-red lamps 65.

On the other hand, convection heaters are not suitable for the grain popper of the present invention. A gas heater positioned as shown in FIGS. 5–7, for example, would be inherently inefficient and would still present some fire hazard, so that the corn popper would not be suitable for use in crowded public facilities such as theater lobbies. By the same token, conventional electrical resistance heaters are not acceptable for use in connection with the invention; most of the heat from heaters of this kind is transferred to the encompassing atmosphere by conduction and must reach the corn or other grain by convection, an arrangement that is not suited to the invention and that retains many of the disadvantages of previously known poppers as discussed in detail above.

The electrically heated corn popper of the present invention provides a dry expansion popping operation from which fire hazard is essentially eliminated. The popper of the invention is quite suited for use in theater lobbies and other crowded public locations. The electrical heating system employed is efficient and affords long sustained life with a minimum of maintenance. The heat source itself is completely out of the path of any waste discharge from the expansion chamber of the popper, so that there can be no substantial deposit of burnt or unburnt waste on the heat source at any time. Despite the high temperatures achieved in the popping area, the outer portion of the heating apparatus, including the lamp holders and the back of the reflector structure as well as the external housing for the heater itself, are held at a suitable low temperature so that there is no danger to the operator of the popper.

I claim:
1. An electrically heated corn popper or like grain expander for dry expansion of cereal grain, comprising:
    a multi-perforate expansion chamber for receiving and retaining a supply of cereal grain for expansion, the expansion chamber having a main outlet for expanded grain and an auxiliary outlet for unexpanded grain and other waste;
    agitation means for agitating the contents of the expansion chamber;
    discharge means for initiating a discharge of unexpanded grain and other waste at a given location relative to the expansion chamber;
    an electrically powered source of radiant heat energy, positioned adjacent to but spaced from the expansion chamber at a heater position displaced from the waste discharge location;
    reflector means, at the heater position, for directing radiant heat energy from the heat source into the expansion chamber to heat the chamber and expand a supply of cereal grain contained therein;
    a popper housing enclosing the expansion chamber, the popper housing having a radiant heat admission aperture aligned with the heater position;
    a heater housing, enclosing the radiant heat source and heater position;
    and forced air cooling means for cooling the heat source without appreciable cooling of the expansion chamber.

2. An electrically heated grain expander, according to claim 1, in which the heat source comprises a plurality of infra-red heat lamps.

3. An electrically heated grain expander, according to claim 1, in which the expansion chamber is a convoluted metal mesh cylinder having a horizontal axis, in which the agitation means comprises means for rotating the cylinder in a given direction about its axis, and in which the waste discharge location is at the bottom of the cylinder and the heater position is at one side of the cylinder.

4. An electrically heated grain expander, according to claim 2, in which the reflector means includes an integral auxiliary waste chute for receiving chaff and other minute waste materials passing through the cylinder mesh, as the cylinder rotates, and for diverting such waste materials past the heater position.

5. An electrically heated grain expander, according to claim 3, in which the base surface of the auxiliary waste chute is covered with removable metal foil to facilitate maintenance of a bright reflective surface.

* * * * *